US012618756B2

(12) United States Patent
Ablain

(10) Patent No.: US 12,618,756 B2
(45) **Date of Patent: *May 5, 2026**

(54) DEVICE CONTAINING GLASS BEADS FUNCTIONALIZED WITH POLYETHYLENEIMINE, AND USE THEREOF FOR CAPTURING MICROORGANISMS

(71) Applicant: MICROBS SAS, Rennes (FR)

(72) Inventor: Wilfried Ablain, Rennes (FR)

(73) Assignee: MICROBS SAS, Rennes (FR)

( * ) Notice: Subject to any disclaimer, the term of this patent is extended or adjusted under 35 U.S.C. 154(b) by 1055 days.

This patent is subject to a terminal disclaimer.

(21) Appl. No.: 17/763,843

(22) PCT Filed: Oct. 27, 2020

(86) PCT No.: PCT/EP2020/080199
§ 371 (c)(1),
(2) Date: Mar. 25, 2022

(87) PCT Pub. No.: WO2021/083907
PCT Pub. Date: May 6, 2021

(65) Prior Publication Data
US 2022/0291095 A1 Sep. 15, 2022

(30) Foreign Application Priority Data
Oct. 31, 2019 (FR) ...................................... 1912288

(51) Int. Cl.
*G01N 1/00* (2006.01)
*B01J 20/28* (2006.01)
(Continued)

(52) U.S. Cl.
CPC ........ *G01N 1/405* (2013.01); *B01J 20/28004* (2013.01); *B01J 20/28011* (2013.01);
(Continued)

(58) Field of Classification Search
CPC ...................................................... G01N 1/405
(Continued)

(56) References Cited

U.S. PATENT DOCUMENTS 8,263,223 B2 * 9/2012 Ericson ............ A61B 17/00491 606/214
2003/0069601 A1 4/2003 Nowakowski et al.

FOREIGN PATENT DOCUMENTS

CA 2773186 A1 * 3/2011 ........... C12N 15/101
WO 2014072366 A1 5/2014
(Continued)

OTHER PUBLICATIONS

Elina Vuorimaa-Laukkanen, et al. "Difference in the core-shell dynamics of polyethyleneimine and poly(l-lysine) DNA polyplexes," European Journal of Pharmaceutical Sciences, vol. 103, 2017, pp. 122-127 (Year: 2017).*
(Continued)

*Primary Examiner* — Elizabeth A Robinson
*Assistant Examiner* — Emily R. Berkeley
(74) *Attorney, Agent, or Firm* — Maier & Maier, PLLC

(57) ABSTRACT

A device containing glass beads functionalized with polyethyleneimine which is adsorbed on the surface of the glass beads, and the use thereof for capturing microorganisms for implementing a method for removing microorganisms or for diagnosing. The microorganisms can be chosen in particular from bacteria and Fungi, in particular yeasts and fungi.

13 Claims, 2 Drawing Sheets

(51) Int. Cl.
*B01J 20/32* (2006.01)
*G01N 1/40* (2006.01)

(52) U.S. Cl.
CPC ....... *B01J 20/3221* (2013.01); *B01J 20/3272* (2013.01); *B01J 20/28019* (2013.01)

(58) Field of Classification Search
USPC .......................................................... 436/178
See application file for complete search history.

(56) References Cited

FOREIGN PATENT DOCUMENTS

| | | |
|---|---|---|
| WO | 2015069942 A1 | 5/2015 |
| WO | 2019132051 A1 | 7/2019 |

OTHER PUBLICATIONS

International Search Report mailed Jan. 28, 2021, in corresponding to International Application No. PCT/EP2020/080199; 7 pages (with English Translation).

* cited by examiner

[Fig 1A]
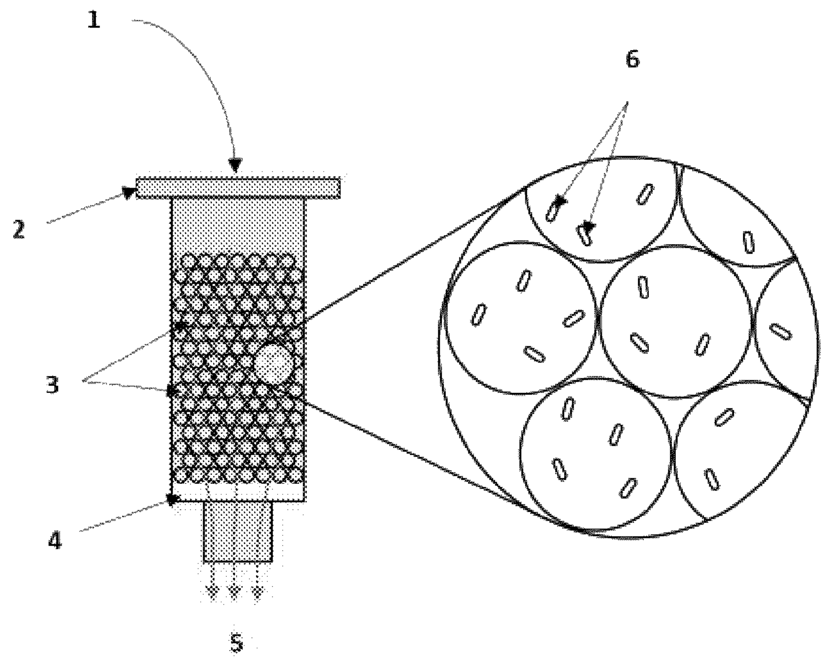
[Fig 1B]
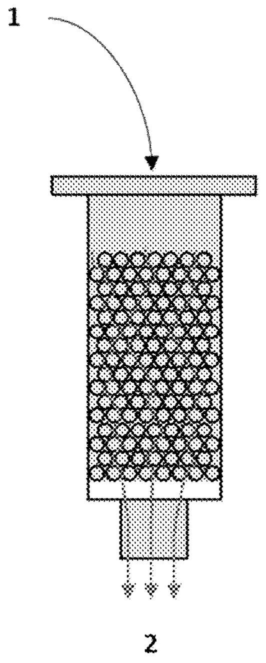

[Fig 2A]
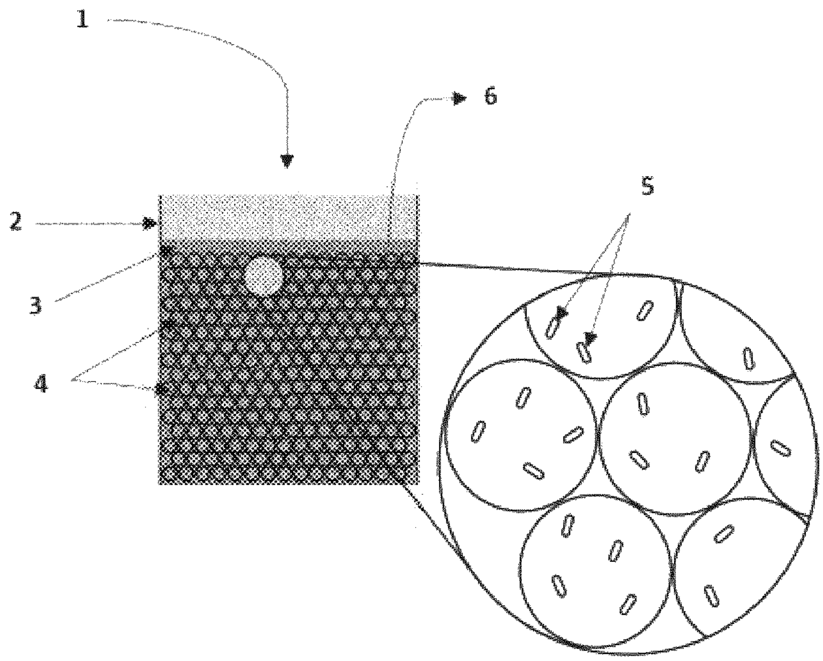
[Fig 2B]
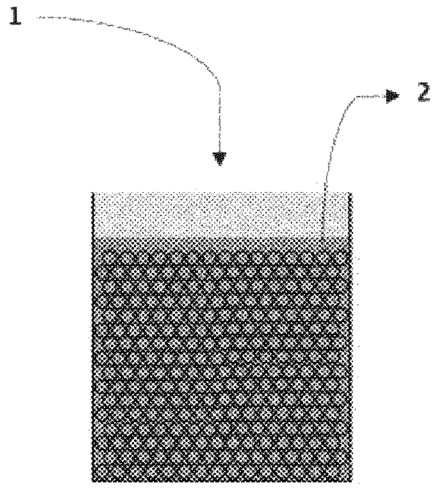

DEVICE CONTAINING GLASS BEADS FUNCTIONALIZED WITH POLYETHYLENEIMINE, AND USE THEREOF FOR CAPTURING MICROORGANISMS

FIELD

The present invention relates to a device containing functionalized glass beads, and its use in capturing micro-organisms for the implementation of a method for the elimination of microorganisms or for diagnosis. The capture of microorganisms is of fundamental interest in many types of industry, such as the pharmaceutical, cosmetic, veterinary or food industries. It can in particular be used for applications which can be divided into two main areas:

The elimination of micro-organisms from potentially contaminated solutions,

Analysis in the form of a diagnosis, in particular in the context of a clinical diagnosis, making it possible to assess the microbiological quality of a solution.

BACKGROUND

To eliminate microorganisms present in potentially contaminated solutions, the techniques used generally involve heat treatment (Magali, WAGNER, Anne Gaëlle MEL-LOUET, and François ZUBER. 2016.

"Continuous heat treatment of pumpable products." "Agribusiness. "Engineering Techniques, Sep. 10, 2016) and/or membrane filtration (Christel, CAUSSERAND, Claire ALBASI, and Hélenè ROUX DE BALMANN. 2017. "Membrane filtration (RO, NF, UF, MF)—Applications in water treatment." "Water technologies." Engineering Techniques, Aug. 10, 2017). The major drawback of heat treatment comes from the fact that the temperature is likely to cause irreversible changes to the product by acting directly on its constituents. Also, at the microbiological level, the heat treatment corresponds to a reduction in the load of microorganisms and it is for example likely to reactivate bacterial spores. Regarding membrane filtration, clogging of the membrane is the main problem that can be encountered. The latter may be due to the concentration of microorganisms in the product as much as to the nature of the product and in particular to the solid particles present within it.

Microbiological analysis requires the use of precise techniques for which the time to obtain the shortest possible result is sought. Indeed, the faster the analysis results are obtained, the more it is possible to initiate corrective actions in the event of unsatisfactory or unacceptable results. In particular, in the medical field, it is necessary to predict and diagnose the risk of infection: the faster and more accurate the diagnosis, the more effective the care of patients and the minimized risk of transmission. However, to demonstrate the presence of microorganisms, it is necessary to take sufficiently large samples to ensure that a minimum quantity of microorganisms is recovered. It is then necessary to increase their concentration, isolate them and identify them. A key step for most of these methods for detecting/quantifying microorganisms in samples that are liquid or made liquid, is their ability to exceed the detection limit of the evaluation technique used.

This is particularly difficult for samples with a low concentration of microorganisms of interest. An enrichment or concentration step often appears necessary for this type of sample, said enrichment step possibly being implemented directly in the packaging in which the sample is located. In this case, it is an enrichment step directly in the product. The enrichment step requires the use of culture media, selective or not, which aim to promote the growth of target microorganisms in biological or environmental samples, while limiting the growth of non-target flora. Thus, the target population, which is often present at low levels compared to the appendix flora present in food, is amplified. These enrichment steps upstream of the analysis make it possible to increase the number of microorganisms of interest in the sample but condemn both the possibility of a rapid analysis but also the possibility of quantifying the initial population of microorganisms of interest.

The other possibility is to go through a stage of concentration of the microorganisms from the liquid sample or made liquid.

One of the most widely used techniques for the concentration of microorganisms from samples is the use of one or more membrane filters of variable porosity through which the liquid medium is filtered. The microorganisms contained in the sample are stopped by the membrane and therefore concentrated. Such a technique is generally implemented for the microbiological analysis of water, drinking water, beverages, or pharmaceutical products. Although easy to use, this membrane filtration method remains limited by factors causing clogging of the membrane filter such as high turbidity, or the presence of particles in the sample. Other factors related to the nature of the filter and its sterilization method can also influence the result of the microbiological analysis, which can seriously alter the viability, precision and sensitivity of the method and lead to erroneous and poorly reproducible results.

We can cite, by way of non-exhaustive example, the inhibition of microbial growth, an abnormal propagation of colonies, the existence of non-wetting zones, the fragility of the filter, a lack of flatness of the filter, a low recovery rate. In addition, the need to concentrate large amounts of sample in order to compensate for spatial and temporal variations in the occurrence of microorganisms, increases the likelihood of membrane filter clogging. Other methods also make it possible to concentrate the microorganisms and separate them from the constituent elements of the sample.

For example, immunocapture or immunoconcentration methods are widely used in many applications. They very often use supports functionalized with antibodies and make it possible to specifically capture or not the microorganisms contained in the sample. These methods are widely used for the microbiological analysis of human fluids or food samples, and can be implemented on raw samples, enriched, or in specific culture media (pre-enrichment and enrichment).

New methods also allow the semi-specific capture of microorganisms using functionalized cell surfaces. They implement derivatives of lectins or carbohydrates, peptides and peptide-mimicking compounds and are applied to broad-spectrum capture and/or specific binding of microorganisms in the sample. Additionally, antimicrobial peptides bound to insoluble compounds have been used to kill, immobilize, and detect microorganisms.

SUMMARY

One of the aims of the invention is to provide a device comprising functionalized glass beads for use in capturing microorganisms. Another object of the invention is to provide a method for the preparation of functionalized glass beads. Another object of the invention is to provide an effective method for capturing microorganisms for use in the elimination of microorganisms or in diagnosis.

A first object of the present invention is a device comprising a hollow container containing glass beads, functionalized with polyethyleneimine adsorbed on the surface of the glass beads.

In particular, the present invention relates to a device comprising a hollow container containing non-porous glass beads, functionalized with polyethyleneimine adsorbed on the surface of the glass beads.

The present invention relates to a device comprising a hollow container containing glass beads, functionalized by polyethyleneimine adsorbed on the surface of the glass beads, the glass beads being in particular made of glass of the soda-lime or borosilicate type, in which the molecular mass of the adsorbed polyethyleneimine ranges from 0.6 to 2000 kDa.

According to a particular embodiment, the present invention relates to a device comprising a hollow container containing glass beads, functionalized by polyethyleneimine directly adsorbed on the surface of the glass beads, in particular without coupling agent between said polyethyleneimine and the surface of the beads. glass beads, preferably by electrostatic interactions, said glass beads being in particular made of glass of soda-lime or borosilicate type, in which the molecular weight of the adsorbed polyethyleneimine is between 0.6 and 2000 kDa.

BRIEF DESCRIPTION OF THE DRAWINGS

FIG. 1A: General principle of operation of capture/elimination of microorganisms in flow mode It represents the general principle of operation of capture/elimination of microorganisms in flow mode. 1 represents the addition of the potentially contaminated solution; 2 represents the column; 3 represents the glass beads functionalized using polyethyleneimine; 4 represents the frit; 5 represents the solution devoid of its microorganisms at the outlet of the column; 6 represents a magnification of the microorganisms immobilized in contact with the functionalized beads.

FIG. 1B: General operating principle of elution in flow mode 1 represents the addition of the elution solution; 2 represents the elution solution at the outlet of the column containing the previously immobilized microorganisms.

FIG. 2A: General operating principle for the capture/elimination of microorganisms in static mode It represents the general operating principle for the capture/elimination of microorganisms in static mode. 1 represents the addition of the potentially contaminated solution; 2 represents the container; 3 represents the potentially contaminated solution brought into contact with the glass beads; 4 represents the glass beads functionalized using polyethyleneimine; 5 represents a magnification of the microorganisms immobilized in contact with the functionalized beads; 6 represents the recovery or disposal of the solution devoid of its microorganisms.

FIG. 2B: General operating principle of elution in static mode 1 represents the addition of the elution solution; 2 represents the sampling of the elution solution provided with the eluted microorganisms.

DETAILED DESCRIPTION

Within the meaning of the present invention, the term "container" is understood to mean an object intended to receive the glass beads.

Within the meaning of the present invention, the term "hollow container" means a container as defined above, comprising a concave space, or a cavity, which can accommodate the glass beads.

Within the meaning of the present invention, the term "glass beads" means elements of spherical or ovoid shape composed of glass.

Within the meaning of the present invention, the term "non-porous glass beads" means smooth glass beads without pores. For example, Poravor®-type beads, or silica gel beads are considered porous.

The glass beads that can be used in the present invention have in particular a density of between 2 and 3 kg/l, in particular of between 2.3 and 2.7 kg/l, in particular of around 2.48 kg/l.

Within the meaning of the present invention, the term "polyethyleneimine" means a polymer in linear or branched form composed of ethylenediamine units. It is a water-soluble polymer of which several products of different molecular weights are commercially available. Polyethyleneimine can be synthesized from Aziridine by ring-opening polymerization, leading to a branched polyethyleneimine.

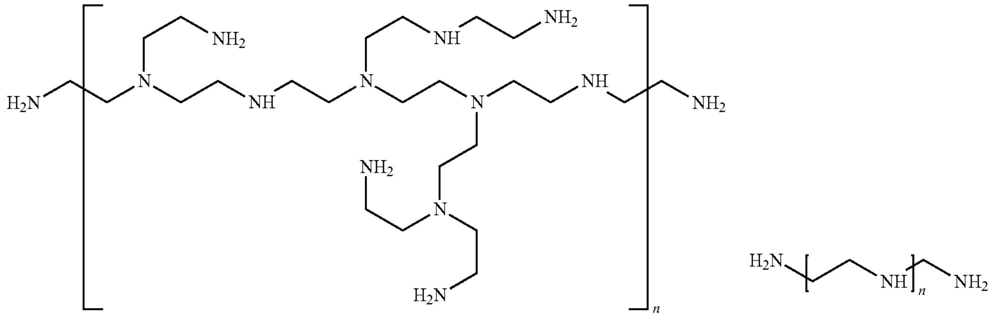

Structure of branched and linear polyethyleneimine

Within the meaning of the present invention, the term "adsorbed on the surface of the glass beads" means the fact that the polyethyleneimine is non-covalently bonded to the surface of the glass beads without however modifying the structure of the glass.

The adsorption method involves van de Waals-type electrostatic interactions between the cationic polymer exhibiting positive charges and the anionic glass surface exhibiting negative charges. The adsorption of cationic polymer on a non-porous glass surface by electrostatic interactions is known. This phenomenon is implemented in particular to adsorb microorganisms on glass plates for observation by optical microscopy, where a cationic polymer, such as polylysine, is added in the medium as a binder between the microorganisms and the glass plate.

The inventors have unexpectedly observed in the case of glass beads functionalized by adsorption of polyethyleneimine, a surprising stability of the interaction between the polyethyleneimine and the glass bead. The glass beads thus functionalized allow the capture of microorganisms in their state, dead or alive, in a medium in a quantitative manner and allow, under elution, the release of all the microorganisms retained on the surface of the glass beads functionalized by the polyethyleneimine while retaining the state, dead or alive, of the microorganisms.

Adsorption has many advantages over the also known covalent bond grafting. Adsorption does not require prior chemical modification of the glass surface in order to introduce functional groups, such as siloxanes, which can react with the polymer. In addition, adsorption involves weak interactions making the method reversible. The glass beads, as well as the polymer can then potentially be recycled by desorption.

Unlike covalent grafting, adsorption can take place in non-specific equipment or apparatus.

Thus, the invention constitutes a means of capture/elimination of microorganisms in a product. Then, with a diagnostic objective, to propose an elution means allowing the release of all the microorganisms retained on the column and guaranteeing cell viability. This makes it possible to provide an accurate quantification of the living microorganisms contained in the sample analyzed.

Surfaces treated with polyethyleneimine find many applications including adhesion and spreading of various cell lines, cell differentiation and outgrowth of neurites, adhesion of transfected cell lines and survival of primary neurons in the culture.

The device of the present invention can be used statically or in flux. The static mode makes it possible to increase the contact time between the glass beads functionalized with polyethylenimine and the contaminated liquid and therefore to maximize the probability of encounter between the beads and the microorganisms. This probability of encounter can be further improved by carrying out manual or mechanical agitation.

The disadvantage of this technique concerns the large volumes of solution to be analyzed or debacterized (100 mL, 250 mL) since they require a large quantity of beads, and therefore a higher cost.

The flow method makes it possible to pass large volumes of liquid in a small space to force, in a way, the microorganisms to encounter the polyethyleneimine adsorbed on the surface of the beads (the quantity of beads used may be 1 g). Thus, if one wishes to obtain a reduced cost per analysis, one can use the static method for small volumes and the flow method for large volumes.

The invention has many advantages over the techniques of the prior art. First of all, it makes it possible to avoid the use of heat treatment to eliminate microorganisms from potentially contaminated solutions and thus to preserve all the original qualities of the product without causing modifications to its constituents. The invention also makes it possible to avoid using membrane filtration and its disadvantages linked, among other things, to clogging. Thus, the invention makes it possible to eliminate the microorganisms contained in liquid samples or made liquid of large volume, samples which can be of different natures and have for example a high turbidity or particles or sediments within it. With regard to microbiological analysis, the present invention relates in particular to a method for capturing and concentrating at least one microorganism likely to be present in a sample with a view to detecting it, quantifying it or evaluating its viability.

This invention thus makes it possible to dispense with an enrichment step, and consequently to considerably reduce the analysis time but also to quantify the initial target population. The microorganism can be a bacterium, a fungus (for example a yeast or a mould) or a virus. This method is particularly applicable to microorganisms contained in complex media. These media corresponding to biological samples can be of human, food, cosmetic, veterinary or pharmaceutical origin.

One of the advantages of the present invention lies in the fact that the product does not undergo any modification in contact with the functionalized glass beads and that this also makes it possible to overcome the problems of clogging. Another advantage of the present invention is the possibility of using the device for capturing microorganisms in continuous flow, without enrichment steps, even if the quantity of microorganisms is low.

It is thus possible to integrate this device into an industrial production unit on which a stage of elimination of microorganisms would be necessary, and this without interrupting the production chain. Therefore, this invention allows a considerable time saving compared to methods involving an enrichment step.

According to a particular embodiment, the present invention relates to a device as described above, comprising a hollow container containing non-porous glass beads, exclusively functionalized by polyethyleneimine adsorbed on the surface of the glass beads.

According to this particular embodiment, the glass beads are exclusively functionalized with polyethyleneimine. The expression “exclusively” refers to the fact that the polyethyleneimine is the only polymer present on the glass beads. A multilayer system with the presence of another polymer is not part of this embodiment.

According to another particular embodiment, the present invention relates to a device as described above, in which the glass beads consist of glass of the soda-lime or borosilicate type.

The type of glass used for the present invention, in particular soda-lime glass, has an advantage in terms of cost which is low.

Within the meaning of the present invention, the term “glass of soda-lime type” means a glass based on silica ($SiO_2$), calcium and sodium.

Within the meaning of the present invention, the term “borosilicate type glass” means a glass based on silica ($SiO_2$) and boron trioxide ($B_2O_3$).

According to another particular embodiment, the present invention relates to a device as described above, comprising a hollow container containing non-porous glass beads, functionalized with polyethyleneimine adsorbed on the surface of the glass beads, the glass beads being in particular made of glass of the soda-lime or borosilicate type.

According to another particular embodiment, the present invention relates to a device as described above, in which the glass beads consist of glass of the soda-lime or borosilicate type not modified beforehand.

In this embodiment, the glass beads have not undergone a chemical treatment, apart from cleaning, modifying the structure of the glass, including for example a treatment with sodium aluminate, before adsorption of the polyethyleneimine.

According to another particular embodiment, the present invention relates to a device as described above, in which the glass beads have a diameter of approximately 20 to approximately 1000 μm, in particular of approximately 20 to 30 μm, of about 30 to 40 μm, about 40 to 50 μm, about 50 to 75 μm, about 75 to 100 μm, about 100 to 200 μm, about 200 to 300 μm, about 300 to 400 μm, from about 400 to 500 μm, from about 500 to 600 μm, from about 600 to 700 μm, from about 700 to 800 μm, from about 800 to 900 μm, from about 900 to 1000 μm. If the size of the glass beads is less than 20 μm, the beads pass through the frit which is supposed to retain them. On the other hand, for beads larger than 1000 μm, the capture rates obtained are low.

The reduction in the size of the beads, combined with a greater number of beads, makes it possible to have a higher contact surface compared to larger beads in fewer numbers.

According to another particular embodiment, the present invention relates to a device as described above, in which the glass beads have a mass of approximately 10 ng to approximately 2 mg, in particular approximately 10 to 50 ng, of about 50 to 100 ng, about 100 to 200 ng, about 200 to 500 ng, about 500 ng to 1 μg, about 1 to 5 μg, about 5 to 10 μg, about 10 to 20 μg, approximately 20 to 50 μg, approximately 50 to 100 μg, approximately 100 to 200 μg, approximately 200 to 500 μg, approximately 500 μg to 1 mg, approximately 1 at 1.5 mg, about 1.5 to 2 mg.

According to another particular embodiment, the present invention relates to a device as described above, in which:

- the glass beads have a diameter of approximately 20 to approximately 1000 μm, in particular of approximately 20 to 30 μm, about 30 to 40 μm, about 40 to 50 μm, about 50 to 75 μm, about 75 to 100 μm, about 100 to 200 μm, about 200 to 300 μm, about 300 to 400 μm, about 400 to 500 μm, about 500 to 600 μm, about 600 to 700 μm, about 700 to 800 μm, about 800 to 900 μm, about 900 to 1000 μm, and/or
- the glass beads have a unit mass of approximately 10 ng to approximately 2 mg, in particular approximately 10 to 50 ng, approximately 50 to 100 ng, approximately 100 to 200 ng, about 200 to 500 ng, about 500 ng to 1 μg, about 1 to 5 μg, about 5 to 10 μg, about 10 to 20 μg, about 20 to 50 μg, about 50 to 100 μg, about 100 to 200 μg, about 200 to 500 μg, about 500 μg to 1 mg, about 1 to 1.5 mg, about 1.5 to 2 mg.

According to another particular embodiment, the present invention relates to a device in which the molecular mass of the adsorbed polyethyleneimine is between 0.6 and 2000 kDa, in particular from approximately 0.6 to 1.3 kDa, from approximately 1, 3 to 10 kDa, about 10 to 25 kDa, about 25 to 100 kDa, about 100 to 250 kDa, about 250 to 500 kDa, 500 to 1000 kDa, about 1000 to 1500 kDa, from about 1000 to 2000 kDa.

By molecular mass is meant the mass molecular mass (Mw).

According to another particular embodiment, the present invention relates to a device in which the adsorbed polyethyleneimine is linear or branched, in particular branched.

Within the meaning of the present invention, the term "branched" means a polymer in which the sequence of monomer units has ramifications.

Within the meaning of the present invention, the term "linear" is understood to mean a polymer in which the sequence of the monomer units takes place in a linear manner.

According to another particular embodiment, the present invention relates to a device as described above, in which the total mass of the glass beads is approximately 10 mg to approximately 1 kg, in particular approximately 10 to 50 mg, about 50 to 100 mg, about 100 to 200 mg, about 200 to 500 mg, about 500 mg to 1 g, about 1 to 2 g, about 2 to 5 g, d about 5 to 10 g, about 10 to 50 g, about 50 to 100 g, about 100 to 200 g, about 200 to 500 g, about 500 g to 1 kg.

One of the first applications of the method is the elimination of microorganisms: thanks to capture, the sample is depleted of the microorganisms initially present.

A second application envisaged is diagnosis: uptake is then used as a means of concentrating microorganisms for diagnosis. The latter can be qualitative, of the presence/absence type, or quantitative. It may or may not be specific to the type of microorganism, and may or may not differentiate living cells from dead cells. The analysis of captured microorganisms can be done directly after capture on beads. These tests can, for example, be based on the detection of the whole cell or the detection/quantification of one of its constituents (DNA, RNA, ATP, enzymes and their activities or more broadly proteins, etc.). To do this, it is possible to elute the microorganisms captured on the beads, possibly followed by a lysis step, or else, to perform the lysis on the microorganisms still captured on the beads, then to elute the released cell constituents. Then, a multitude of techniques can be used, including flow or solid phase cytometry, colorimetry, spectroscopy, microscopy, ATPmetry (ATP: Adenosine triphosphate), PCR (Polymerase Chain Reaction or chain reaction by polymerase), RT-PCR (Reverse Transcriptase Polymerase Chain Reaction or polymerase chain reaction after reverse transcription), isothermal amplification or immunological detection.

According to another particular embodiment, the present invention relates to a device as described above, in which the hollow container is in the form of a tube, a flask, a beaker or a pot.

According to another particular embodiment, the present invention relates to a device as described above, in which the hollow container is in the form of a column optionally comprising a frit.

Within the meaning of the present invention, when the column comprises a sinter, the column and the sinter can be two elements of the same assembly, or two separate elements that can be assembled.

According to another particular embodiment, the present invention relates to a device as described above, in which the column has a volume of approximately 0.5 mL to approximately 2 L, in particular approximately 0.1 to 1 mL, about 1 to 2 mL, about 2 to 5 mL, about 5 to 10 mL, about 10 to 50 mL, about 50 to 100 mL, about 100 to 200 mL, d about 200 to 500 mL, about 500 mL to 1 L, about 1 L to 2 L, and the frit has a porosity less than the size of the glass beads used.

According to another particular embodiment, the present invention relates to a device as described above, in which the hollow container is in the form of a tube, a flask, a beaker or a pot, said container hollow being in particular in the form of a column optionally comprising a sinter, said column having in particular a from about 0.5 mL to about 2 L and the sinter having in particular a porosity less than the size of the glass beads used.

The size of the column is chosen according to the total mass of the beads, as well as the quantities of the solutions used (polyethyleneimine solutions, capture solutions and elution solutions). A larger quantity of beads requires a column of higher size, which the skilled person can choose.

According to another particular embodiment, the present invention relates to a device as described above, in which the glass beads have a diameter of approximately 20 to approximately 1000 μm, and a mass of approximately 10 ng to approximately 2 mg, in which the glass is of the soda-lime or borosilicate type, functionalized by polyethyleneimine adsorbed on its surface, in which the polyethyleneimine has a molecular weight between 0.6 and 2000 kDa, in which the polyethyleneimine is branched or linear, wherein the container is in the form of a tube, flask, beaker, pot or column optionally comprising a frit, wherein the column has a volume of 0.5 ml to 2 L, and the frit has a porosity less than the size of the glass beads used and in which the total weight of the beads is between 10 mg and 1 kg.

A second object of the invention is a method for preparing a glass bead used in the device as described above, comprising a step of bringing the polyethyleneimine into contact with a glass bead to obtain a glass bead not porous functionalized by polyethyleneimine adsorbed on its surface.

Adsorption consists of bringing an aqueous solution of polyethyleneimine in a concentration of 0.1% to 5% (mass percentages) into contact with the surface of the glass bead for an average period of 5 to 10 minutes, in particular about ten minutes. Rinsing with water nevertheless makes it possible to eliminate the excess polyethyleneimine, to reduce the mortality induced and to improve any elution of the microorganisms. Drying is then carried out in the open air or accelerated using a vacuum chamber system, or by freeze-drying. The drying time can thus be reduced to about ten minutes. At the end of these different steps, the beads are functionalized and ready to use.

According to another particular embodiment, the present invention relates to a method for preparing a glass bead used in the device as described above, comprising a step of bringing a solution of polyethyleneimine into contact with a bead of glass for 1 minute to 24 hours, including 1 to 5 minutes, 5 to 10 minutes, 10 to 15 minutes, 15 to 20 minutes, 20 to 25 minutes, 25 to 30 minutes, 30 minutes to 1 hour, from 1 to 2 hours, from 2 to 5 hours, from 5 to 10 hours, from 10 to 24 hours, preferably from 10 minutes to 24 hours, to obtain a glass bead functionalized with adsorbed polyethyleneimine.

When the contact time is less than 1 minute, the functionalization of the glass beads is not always adequate. The contact time increases as a function of the total mass of the beads to be functionalized. For example, for the functionalization of 300 mg of beads, a functionalization time of 5 minutes may be sufficient, while for the functionalization of 1 g of beads, a contact time of 10 minutes is recommended.

According to another particular embodiment, the present invention relates to a method for preparing a glass bead used in the device as described above, in which the polyethyleneimine solution is at a concentration of 0.1 and 5%, in particular from 0.1 to 0.5%, from 0.5 to 1%, from 1 to 2%, from 2 to 3%, from 3 to 4%, from 4 to 5% to obtain a glass bead functionalized with polyethyleneimine.

According to another particular embodiment, the present invention relates to a method for preparing a glass bead used in the device as described above, in which the volume of the polyethyleneimine solution used is comprised from 4 μl to approximately 0.5 L, in particular about 4 to 25 μl, about 25 to 50 μl, about 50 to 100 μl, about 100 to 250 μl, about 250 to 500 μl, about 500 μl to 1 ml, from about 1 to 2.5 ml, from about 2.5 to 5 ml, from about 5 to 25 ml, from about 25 to 50 ml, from about 50 to 100 ml, d approximately 100 to 250 ml, approximately 250 ml to 0.5 L, to obtain a glass bead functionalized with polyethyleneimine.

According to another particular embodiment, the present invention relates to a method for preparing a glass bead used in the device as described above, comprising a step of bringing the polyethyleneimine into contact with a glass bead, in particular for a duration of 1 minute to 24 hours, in which the polyethyleneimine solution is in particular at a concentration between 0.10 and 5%, and in which the volume of the polyethyleneimine solution used is in particular comprised from 4 μl to 0.5 L, to obtain a glass bead functionalized with polyethyleneimine.

The concentration and the volume of the polyethyleneimine solution to be used are dependent on the total surface area of the beads to be functionalized. It is possible to calculate said surface from the total mass, size and density of the beads used.

- The surface per bead can be calculated with the formula $4\pi r^2$ (r being the radius of the bead)
- The volume per bead can be calculated with the formula $(4/3)\pi r^3$ (r being the radius of the bead)
- The volume total beads can be calculated by dividing the total mass of the beads by the density
- The number of beads can be calculated by dividing the total volume of the beads by the volume per bead
- Finally, the total surface of the beads is obtained by the multiplication of the surface per bead and the number of beads A higher total surface requires the use of a larger quantity of polyethyleneimine. This larger amount can be provided by using a larger volume of solution, using a more concentrated solution, or a combination of both.

By way of example, it is possible to use 0.5 ml of a 0.16% solution of polyethyleneimine in order to functionalize 1 g of 105-150 μm beads (example 12). In this case, the total surface of the beads is approximately 188 $cm^2$ (said beads having a bead density of 2.50 $g/cm^3$). On the other hand, 1 g of 30-50 μm beads have a larger calculated surface (600 $cm^2$). Under these conditions, also using a polyethyleneimine concentration of 0.16%, about 3.2 times more solution (600/188) is necessary in order to carry out the functionalization under the same conditions as before. It is also possible to use 0.5 ml of a solution 3.2 times more concentrated, or to modify the concentration and the volume by applying a rule of three.

According to another particular embodiment, the present invention relates to a method for preparing a glass bead used in the device as described above, comprising a step of drying for a period of 1 minute to 12 hours, in particular of 1 to 5 minutes, 5 to 10 minutes, 10 to 15 minutes, 15 to 20 minutes, 20 to 25 minutes, 25 to 30 minutes, 30 minutes to 1 hour, 1 to 2 hours, 2 at 5 hours, from 5 to 12 hours, to obtain a glass bead functionalized with polyethyleneimine.

According to another even more particular embodiment, the present invention relates to a method for preparing a glass bead used in the device as described above, comprising a step of drying for a period of approximately 10 minutes, to obtain a glass bead functionalized with adsorbed polyethyleneimine.

The drying time of approximately 10 min corresponds to the duration of the drying step when the latter is accelerated using a vacuum chamber system with the depression set to its maximum (~900 mbar on the pressure gauge before valve opening). When drying is carried out in the open air, the drying time is longer and can reach approximately 12 hours.

Within the meaning of the present invention, the term “drying” means a method of drying in the open air or accelerated using a vacuum chamber system, or by freeze-drying.

According to another particular embodiment, the present invention relates to a method of preparation as described above, in which the drying step is carried out in the open air or accelerated by airflow, in particular at a temperature ranging from room temperature to 90° C., in particular from room temperature to 80° C., from room temperature to 60° C., from room temperature to 30° C., from 30° C. to 40° C., from 40° C. to 50° C. and from 50° C. to 60° C., or from 60° C. to 90° C., to obtain a glass bead functionalized with polyethyleneimine.

Within the meaning of the present invention, the term "ambient temperature" means a temperature ranging from approximately 20° C. to approximately 25° C.

According to another particular embodiment, the present invention relates to a preparation method as described above, comprising a rinsing step with an aqueous solution, in particular water, prior to the drying step, to remove the polyethyleneimine not adsorbed during the contacting step.

Within the meaning of the present invention, the term "aqueous solution" means a liquid phase containing water. Examples of aqueous solutions that can be used are water, aqueous solutions of 1 M NaCl or 50 mM Tris. The objective during rinsing may be to lower the pH using an acidic solution in order to maximize the positive charges on the surface of the polyethyleneimine; it is possible in this case to use acids such as citric acid or acetic acid.

According to another particular embodiment, the present invention relates to a method for preparing a glass bead used in the device as described above, comprising the following steps:

- a step of bringing a solution of polyethyleneimine with a glass bead in particular for a period of 1 minute to 24 hours, in which the polyethyleneimine solution is in particular at a concentration between 0.10 and 5%, and in which the volume of the polyethyleneimine solution used is in particular included from 4 μl to 0.5 L, to obtain a glass bead functionalized with polyethyleneimine; a drying step for a duration of 1 minute to 12 hours, in particular a duration of approximately 10 minutes, in which the drying step is carried out in the open air or accelerated by air flow, in particular at a temperature ranging from room temperature to 90° C.

According to another particular embodiment, the present invention relates to a method of preparation as described above, comprising a drying step lasting from 1 minute to 12 hours, in particular a duration of about 10 minutes, at room temperature.

According to another particular embodiment, the present invention relates to a method for preparing a glass bead used in the device as described above, comprising the following steps:

- a step of bringing a solution of polyethyleneimine with a glass bead in particular for a period of 1 minute to 24 hours, in which the polyethyleneimine solution is in particular at a concentration between 0.10 and 5%, and in which the volume of the polyethyleneimine solution used is in particular included from 4 μl to 0.5 L, to obtain a glass bead functionalized with polyethyleneimine;
- a rinsing step with an aqueous solution, in particular water, to remove the polyethyleneimine not adsorbed during the contacting step;
- a drying step for a duration of 1 minute to 12 hours, in particular a duration of approximately 10 minutes, in which the drying step is carried out in the open air or accelerated by air flow, in particular at a temperature ranging from room temperature to 90° C.

According to another particular embodiment, the present invention relates to a method of preparation as described above, comprising a drying step lasting from 1 minute to 12 hours, in particular a duration of approximately 10 minutes, at ambient temperature.

According to another particular embodiment, the present invention relates to a method for preparing a glass bead used in the device as described above, comprising the following steps:

- a step of rinsing and drying the glass beads with water;
- a step of bringing a polyethyleneimine solution into contact with a glass bead, in particular for a period of 1 minute to 24 hours, in which the polyethyleneimine solution is in particular at a concentration between 0.10 and 5%, and in in which the volume of the polyethyleneimine solution used is in particular comprised from 4 μl to 0.5 L, to obtain a glass bead functionalized with polyethyleneimine;
- a rinsing step with an aqueous solution, in particular water, to remove the polyethyleneimine not adsorbed during the contacting step;
- a drying step for a duration of 1 minute to 12 hours, in particular a duration of approximately 10 minutes, in which the drying step is carried out in the open air or accelerated by air flow, in particular at a temperature ranging from room temperature to 90° C.

According to another particular embodiment, the present invention relates to a preparation method as described above, comprising a drying step lasting from 1 minute to 12 hours, in particular a duration of approximately 10 minutes, at ambient temperature.

According to another particular embodiment, the present invention relates to a method for preparing a glass bead used in the device as described above, in which said solution of polyethyleneimine is free of borate.

According to another particular embodiment, the present invention relates to a method for preparing a glass bead used in the device as described above, in which a polyethyleneimine crosslinking agent is not introduced.

A third object of the invention is the use of a device as described above, for capturing microorganisms with a view to diagnosis.

Within the meaning of the present invention, the term "microorganisms" means living or dead microscopic organisms. Examples of microorganisms that can be picked up are bacteria, yeasts, fungi, viruses, archaea, microalgae, and certain microscopic parasites.

Within the meaning of the present invention, the term "diagnosis" means the detection of the captured microorganisms.

Examples of diagnostic techniques that can be used include flow or solid phase cytometry, colorimetry, spectroscopy, microscopy, ATPmetry (ATP: Adenosine triphosphate), PCR (Polymerase Chain Reaction or chain reaction by polymerase), RT-PCR (Reverse Transcriptase Polymerase Chain Reaction or reverse transcription polymerase chain reaction), isothermal amplification, or immunological detection.

According to another particular embodiment, the present invention relates to a use as described above, for the capture of microorganisms with a view to eliminating or reducing the load of microorganisms from liquid samples or viscous likely to contain said micro-organisms. Within the meaning of the present invention, the term "elimination or reduction of the load of microorganisms" means the action of reducing the quantity of microorganisms present in a sample.

Another object of the invention is a method for capturing microorganisms comprising a step of bringing a liquid or viscous sample containing said microorganisms into contact with a device as described above, under conditions making it possible to create an interaction between the said microorganisms and the glass beads, and to obtain the said microorganisms captured on the glass beads.

According to another particular embodiment, the present invention relates to a method as described above, in which the step of bringing a liquid or viscous sample containing the said microorganisms into contact is carried out in a single pass in the device according to the invention and is not performed iteratively. A single pass through the device according to the invention makes it possible to quantitatively capture all of the microorganisms present in said liquid or viscous sample. For example, it is not necessary to make multiple passes of the liquid or viscous sample through a column containing the functionalized glass beads to capture or concentrate the microorganisms in the column.

According to another particular embodiment, the present invention relates to a method as described above, in which the proportion of microorganisms originating from the sample and captured on the glass beads is between 0.001% and 100% by view of the debacterization of said sample.

According to another particular embodiment, the present invention relates to a method as described above, comprising an additional step of eluting the previously captured microorganisms under conditions allowing the separation of the above-mentioned microorganisms captured from the above-mentioned beads of glass and the recovery of said micro-organisms. Elution with a chemical solution is carried out at room temperature.

According to another particular embodiment, the present invention relates to a method as described above, in which during the elution step the proportion of the microorganisms separated from the glass beads on which the aforesaid microorganisms had previously captured and then recovered is between 0.001% and 100%.

According to another particular embodiment, the present invention relates to a method as described above, in which the recovery of microorganisms is carried out for the purpose of diagnosis. This diagnosis can be qualitative, of the presence/absence type, or quantitative. It may or may not be specific to the type of microorganism, and may or may not differentiate living cells from dead cells.

According to another particular embodiment, the present invention relates to a method as described above, comprising:

- a step of bringing into contact, preferably non-iterative, a liquid or viscous sample containing said microorganisms, with glass beads contained in the device described above, under conditions making it possible to create an interaction between the said micro-organisms and the glass beads, and to obtain the said microorganisms captured on the glass beads,
- a additional step of eluting the previously captured microorganisms under conditions allowing the separation of the aforementioned microorganisms captured from the aforementioned glass beads and the recovery of the said microorganisms.

According to another particular embodiment, the present invention relates to a method as described above, in which the elution step is carried out using a solution of the chemical type.

Within the meaning of the present invention, the chemical type elution solutions that can be used are for example: NaCl 1 M, Tris 50 mM pH 7.5, Tris 50 mM pH 9.5, sodium hexametaphosphate 0.01% to 0.1% EDTA 0.1 to 10%, baking soda 1%, sodium citrate 10%, acetic acid 0.1 to 10%, methanol 0.1 to 10%, pluronic F-1270.01 to 0.1% (poloxamer 407, non-ionic three-block copolymer: Poly(ethylene glycol)-block-poly(propylene glycol)-block-poly(ethylene glycol)).

According to another particular embodiment, the present invention relates to a method as described above, in which the bringing into contact of the sample with the glass beads or the device takes place statically or in flux.

Within the meaning of the present invention, the term "statically" means the fact that the bringing into contact between the sample and the glass beads takes place in a container without there being a continuous movement of the sample. and that the sample is not renewed during contacting.

Static contacting requires that at the end of the contact time the sample be separated from the glass beads. This step can for example be carried out by aspiration of the liquid through a frit or by sampling the liquid. When the capture method is carried out statically, the step of bringing the sample containing the microorganisms into contact with glass beads is carried out over a period of 5 to 15 minutes before the aspiration is triggered and carried out using the vacuum chamber.

Within the meaning of the present invention, the term "in flow" means the fact that the bringing into contact between the sample and the glass beads takes place in a container allowing the sample to flow continuously between the glass marbles.

According to another particular embodiment, the present invention relates to a method as described above, in which the microorganisms are chosen from bacteria, and fungi, in particular yeasts and fungi.

According to another particular embodiment, the present invention relates to a method as described above, in which the Fungi belong to the genera *Absidia, Alternaria, Aspergillus, Aureobasidium, Botrytis, Brettanomyces, Byssochlamys, Candida, Chaetomium, Cladosporium, Colletotrichum, Cryptococcus, Debaryomyces, Emericella, Epicoccum, Eupenicillium, Eurotium, Fusarium, Galactomyces, Geotrichum, Gliocladium, Hanseniaspora, Humicola, Hyphopichia, Kluyveromyces, Lichtheimia, Lodderomyces, Meyerozyma, Monascus, Mucor, Mycocladus, Neosartorya, Nigrospora, Paecilomyces, Penicillium, Pestalotia, Phoma, Phytophthora, Pichia, Pythium, Rhizoctonia, Rhizopus, Rhodotorula, Saccharomyces, Saccharomycopsis, Schizosaccharomyces, Sclerotinia, Scopulariopsis, Serpula, Stemphylium Talaromyces, Thielaviopsis, Torulaspora, Trichoderma, Trichosporon, Trichothetium, Ulocladium, Verticillium, Wallemia, Wickerhamomyces, Xylaria, Zygosaccharomyces.*

According to another particular embodiment, the present invention relates to a method as described above, in which the bacteria are Gram+ or Gram− bacteria.

Gram+ bacteria are detected by the Gram staining technique. After staining, said bacteria appear in purple color during a microscopic analysis. In contrast, Gram− bacteria are not stained purple in the Gram stain test.

According to another particular embodiment, the present invention relates to a method as described above, in which the bacteria belong to the genera *Acetobacter, Achromobacter, Acidovorax, Acinetobacter, Actinomyces, Aerococcus, Aeromonas, Alcaligenes, Alicyclobacillus, Aquaspirillum, Asaia, Bacillus, Bifidobacterium* sp., *Bordetella, Brachybacterium, Brevibacillus, Brevibacterium, Brevundimonas, Burkholderia, Buttiauxella, Campylobacter, Carno-*

*bacterium, Cellulomona, Citrobacter, Clavibacter Clostridium, Corynebacterium, Cronobacte, Cupriavidu, Curtobacterium, Elizabethkingia, Enteractinococcus, Enterobacter, Enterococcus, Escherichia, Flacklamia, Flavobacterium, Geobacillus, Glutamicibacte, Halobacillus, Klebsiella, Kocuria, Lactobacillus, Lactococcus, Leclercia, Lelliottia, Leuconostoc, Lysinibacillus, Macrococcus, Methylobacteriu, Microbacterium* spp. (CDC A-5), *Micrococcus, Moraxell, Mycobacterium, Nesterenkonia, Oceanobacillus* sp, *Ochrobactrum, Paenibacillus, Pandorae, Pantoea, Paracoccus, Pasteurell, Pediococcus, Propionibacterium, Proteus, Pseudomonas, Ralstonia, Rhizobium, Roseomona, Rothia, Salmonella, Sanguibacter, Serratia, Shewanella, Sphingomonas, Sporolactobacillus, Sporosarcina, Staphylococcus, Stenotrophomonas, Streptococcus, Streptomyces, Thermoanaerobacterium, Variovorax, Virgibacillus.*

According to another particular embodiment, the present invention relates to a method as described above, in which the liquid or viscous sample is chosen from:

- a biological, human or veterinary sample, such as urine, blood, synovial fluid, lymph, tear fluid, secretions, mucous membranes,
- a pharmaceutical sample, such as solutions for injection, syrups, vaccines, eye drops, ophthalmic gels,
- a cosmetic sample, such as make-up removers, skin cleansing preparations, deodorants, shaving preparations, self-tanners, sun protection creams, solvents, shampoos, conditioners,
- a food sample, such as drinks, in particular water (still, sparkling and/or flavoured), milk, fruit juices, such as orange juice, sodas, alcoholic drinks, tea base, meats, ready meals, dairy products, egg products,
- A sample of method water, such as a sample from cleaning loops, production water,
- A sample of type environmental, such as marine or rain samples.

Within the meaning of the present invention, the term "biological sample" means a sample originating from a bodily fluid or from a tissue of a human or animal body. Examples of biological samples that can be used are urine, blood, synovial fluid, lymph, tear fluid, secretions, mucous membranes.

Within the meaning of the present invention, the term "pharmaceutical sample" means a sample from a pharmaceutical product containing chemical, natural or synthetic substances for human or veterinary use.

Examples of pharmaceutical samples that can be used are solutions for injection, syrups, vaccines, eye drops, ophthalmic gels, nasal solutions, vaccination supplements made liquid, powders made liquid.

Within the meaning of the present invention, the term "cosmetic sample" means a sample from a cosmetic product containing a substance or a mixture intended to be brought into contact with the various surface parts of the human body, in sight, exclusively or mainly, to clean them, to perfume them, to modify their appearance, to protect them, to keep them in good condition or to correct body odours. Examples of cosmetic samples that can be used are make-up removers, products for cleaning the skin, deodorants, products intended for shaving, self-tanners, sun protection creams, solvents, shampoos, conditioners, make-up remover lotions, creams, emulsions, soaps, cleaning agents.

Within the meaning of the present invention, the term "food sample" means a sample from a food product that can be used as food or drink for a human or animal. Examples of food samples that can be used are beverages, including water (still, sparkling and/or flavored), milk, fruit juices, sodas, alcoholic beverages, tea-based beverages, meats, ready meals, dairy products, egg products, charcuterie, fish, eggs, soups, fruit concentrates. Within the meaning of the present invention, the term "sample of method water" means a sample from a production plant, in particular a sample of water entering a production method. Examples of method water samples that can be used are samples from cleaning loops, production water, a washing tower, a cooling tower.

Within the meaning of the present invention, the term "sample of environmental type" means a sample originating from the environment.

Examples of environmental type samples that can be used are samples of soil, water, in particular sea water, river, river. Another object of the invention is a kit comprising glass beads, polyethyleneimine and a device in the form of a column and chemical type elution solutions. According to another particular embodiment, the present invention relates to a kit comprising glass beads, polyethyleneimine and a device in the form of a column and chemical type elution solutions, for capturing microorganisms with a view to diagnosis, or with a view to eliminating or reducing the load of microorganisms from liquid or viscous samples likely to contain said microorganisms. According to another particular embodiment, the present invention relates to a kit comprising glass beads, polyethyleneimine and a device in the form of a column for its use to implement the device according to the invention and elution solutions of the type chemical, for the capture of microorganisms with a view to diagnosis, or with a view to eliminating or reducing the load of microorganisms from liquid or viscous samples likely to contain the said microorganisms.

EXAMPLES

Example 1 General Protocol for the Adsorption of Polyethyleneimine on Glass Beads 1 g of glass beads with a diameter of 105-150 μm (ref. 15927, Polysciences Europe GmbH, Germany) are weighed directly in 2.4 mL filtration columns by polypropylene fitted with a HDPE sinter with a porosity of 45-90 μm (ref. 208-3049-03S, Evergreen Scientific, USA). The assembly is placed on a plate adapted to be able to place 24 columns simultaneously (NucleoVac Adapter Plate, ref. 740694, Macherey-Nagel GmbH & Co. KG, Germany) which is integrated into a NucleoVac96 vacuum chamber (ref. 740681, Macherey-Nagel GmbH & Co. KG, Germany). The whole is connected to a KNF type N816.1.2KN.45.18 vacuum pump (KNF Neuberger SAS, France). A solution of branched polyethyleneimine (1.3 kDa, ref. 482595 Sigma-Aldrich) at 0.166% in biological deionized water (Ref. W4502, Sigma-Aldrich, Merck KGaA, Darmstadt, Germany) is added to each column. The mixture is homogenized for 10 minutes using a 10 μl filter tip, followed by rinsing with molecular biology water (1 ml). For each aspiration, the pump vacuum is set to 700 mbar vacuum. After rinsing, the columns are functionalized and ready to use.

Example 2: Preparation of the Strains

The strains of microorganisms were thawed using a cryobead in an appropriate liquid or solid medium before being placed at a temperature allowing their growth for the time necessary for their growth. The strains underwent two minimum subcultures at 2% in an appropriate liquid medium or by transfer to solid medium before being used for the tests.

Example 3: Preparation of the Working Suspensions

The daughter suspensions were prepared in water supplemented or not with 0.85% NaCl by successive dilutions (usually tenths).

From the daughter suspensions produced, liquid matrices (fruit juices, sodas, still, sparkling water, flavored or not) were inoculated in order to contain microorganisms for the tests. To do this, the last dilution was made in the matrix to be tested.

Example 4: General Static Capture Protocol

A small volume (from 500 μL to 1 mL) of solution containing a given quantity of microorganisms (from 20 to ~$10^7$ units) was introduced into a column containing 1 g of glass beads functionalized with polyethyleneimine. A contact time of 5 to 15 min was applied before the aspiration was triggered and carried out using the vacuum chamber, the depression of the pump being fixed at 50 mbar.

Example 5: General Flow Capture Protocol

A given volume (from 500 μL to 100 mL) of solution containing a given quantity of microorganisms (from 20 to ~$10^7$ units) was filtered through a column containing 1 g of functionalized glass beads by polyethyleneimine.

The aspiration was triggered before the introduction of the solution and was carried out using the vacuum chamber, the depression of the pump was fixed at 50 mbar.

Example 6: General Chemical Elution Protocol

After passing the sample of interest through the column, an elution solution was introduced in order to proceed with the removal of the microorganisms. The quantity of elution solution was variable but was at least 500 μL in order to cover all the beads present in the column. The solution was chemical in nature. All chemical solutions (1 M NaCl, 50 mM Tris pH 7.5, 50 mM Tris pH 9.5, sodium hexametaphosphate 0.01% to 0.1 EDTA 0.1 to 10%, sodium bicarbonate 1%, sodium citrate 10%, acetic acid 0.1 to 10%, methanol 0.1 to 10%, pluronic F-1270.01 to 0.1%) were prepared using deionized water then filtered through a 0.2 μm filter. The percentages mentioned above correspond to a weight/volume ratio of water (g/100 mL).

Aspiration was triggered before introduction of the solution or after a more or less long contact time (minimum 5 minutes tested). The filtration was carried out using the vacuum chamber, the depression of the pump being fixed at 700 mbar.

Example 7: Evaluation of the Uptake and/or Elution Rate

The evaluation of the uptake or elution rate could be carried out in different ways depending on the quantity of microorganisms present and the volume of solution to be analyzed. For example, it was possible to assess the number of microorganisms present in a given solution using (1) flow cytometry, (2) filtration on a membrane deposited on agar medium, (3) by observation microscope or even (4) smearing on a Petri dish.

Example 7-1: Evaluation of the Uptake and/or Elution Rate by Flow Cytometry

Flow cytometry required a relatively high concentration of microorganisms to obtain a reliable result (~$10^5$ CFU/mL).

The results in terms of uptake and elution rates were obtained as described below. The permeates obtained after capture were analyzed using a cytometer to evaluate the number of microorganisms not captured. It was thus possible to deduce the number of microorganisms captured on the column given that the quantity of microorganisms previously introduced into the column is known (count carried out with a cytometer). For the elution, the number of eluted microorganisms was directly measured using the cytometer. It should be noted that it was possible to mark the microorganisms, which made it possible both to better discriminate the microorganisms from the background noise and at the same time to describe their physiological state (alive or dead) at a given moment.

Example 7-2: Evaluation of the Rate of Uptake and/or Elution by Filtration on a Membrane Deposited on an Agar Medium Filtration on a membrane made it possible to concentrate the microorganisms. It was then possible to deposit this membrane on a medium favorable to their growth at a given temperature and for a defined time.

The independent filtrations of permeates and eluates thus made it possible to calculate the uptake and elution rates in the same way as for flow cytometry. For this, it was necessary to count the colonies on the membrane after the incubation time.

Example 7-3: Evaluation of the Uptake and/or Elution Rate by Membrane Filtration for Observation Under a Microscope Membrane filtration made it possible to concentrate the microorganisms and to observe them after labeling directly under the microscope. In the same way as before, it was then necessary to count the microorganisms present on the membrane using a microscope. As a reminder, markers make it possible to describe the physiological state of microorganisms (living or dead) at a given moment, which growth on a membrane in a Petri dish (Example 7-2) or spreading on an agar medium does not allow (Example 7-4) for which only viable and cultivable microorganisms are observable, and this, at least 24 hours after deposition.

Example 7-4: Evaluation of the Uptake and/or Elution Rate by Membrane Filtration for Spreading on a Petri Dish Another method consists of spreading all or part of the permeates and eluates on a medium agar (in a Petri dish) favorable to the growth of microorganisms. This method required a variable incubation time at a given temperature. In the same way as before, it was then necessary to count the microorganisms present on the box in order to deduce the uptake and elution rates, the number of microorganisms introduced being known thanks to the same spreading method.

Example 8

Protocol for the Functionalization of Glass Beads 300 mg of glass beads with a diameter of 30-50 μm were distributed in 0.8 mL columns equipped with a 20 μm frit. 142.8 μL of an aqueous solution of polyethyleneimine (branched, 25 kDa) at 0.5% (m/v) was added to each of the columns. A contact time of 5 min was observed between the beads and the polyethyleneimine.

The solution was then removed using a vacuum chamber system and a pump set to 50 mbar vacuum. The column was rinsed using 1 mL of molecular biology water with the same depression. The pump was then set to 700 mbar vacuum for drying for 5 minutes. After this step, the glass beads functionalized with polyethyleneimine were ready to use.

Protocol for Capture/Elimination of Micro-Organisms

Initially, a count of the stock suspension of *Escherichia coli* CIP 54.8 was carried out by successive tenth dilutions in physiological water 0.85% NaCl and spreading on media agar in a Petri dish, as well as in cytometry. 500 μL of suspension at the desired concentration were added per column and the capture method was carried out in flow using the vacuum chamber system. The vacuum was set to 50 mbar. The 500 μL of suspension having passed through the column were collected in a tube then a count was carried out by successive tenth dilutions in 0.85% NaCl physiological water and spreading on agar medium in a Petri dish, as well as by cytometry.

Effectiveness of Capture/Elimination of Micro-Organisms

Table 1 shows the number of Colony Forming Units (CFU) introduced and the corresponding capture rate, evaluated by spreading on agar media in a Petri dish.

TABLE 1

Results of the capture of microorganisms

| Column | Introduced CFU | Percentage of capture | Mean |
|---|---|---|---|
| 1 | $9.82 \times 10^6$ | 90.28% | 76.66% |
| 2 | $9.82 \times 10^6$ | 71.99% | |
| 3 | $9.82 \times 10^6$ | 67.73% | |

Table 2 presents the number of Colony Forming Units introduced and the corresponding uptake rate, evaluated by cytometry.

TABLE 2

Results of the capture of microorganisms

| Column | Introduced CFU | Percentage of capture | Mean |
|---|---|---|---|
| 1 | $1.46 \times 10^7$ | 91.27% | 80.10% |
| 2 | $1.46 \times 10^7$ | 77.48% | |
| 3 | $1.46 \times 10^7$ | 71.53% | |

Example 9

Protocol for the Functionalization of Glass Beads 300 mg of glass beads with a diameter of 30-50 μm were distributed in 0.8 mL columns equipped with a 20 μm frit. 142.8 μL of an aqueous solution of polyethyleneimine (branched, 1.3 kDa) at 0.5% (m/v) was added to each of the columns.

A contact time of 5 min was observed between the beads and the polyethyleneimine. The solution was then removed using a vacuum chamber system and a pump set to 50 mbar vacuum. The column was rinsed using 1 mL of molecular biology water with the same depression. The pump was then set to 700 mbar of depression for drying for 5 min. After this step, the glass beads functionalized with polyethyleneimine were ready to use.

Protocol for Capture/Elimination of Micro-Organisms

Initially, a count of the stock suspension of *Escherichia coli* CIP 54.8 was carried out by successive tenth dilutions in physiological water 0.85% NaCl and spreading on media agar in a Petri dish, as well as in cytometry. 500 μL suspension at concentration were added per column and the capture method was carried out in flux using the vacuum chamber system.

The vacuum was set to 50 mbar. The 500 μL of suspension having passed through the column were collected in a tube then a count was carried out by successive tenth dilutions in 0.85% NaCl physiological water and spreading on agar medium in a Petri dish, as well as by cytometry.

Efficiency of Capture/Elimination of Micro-Organisms

Table 3 shows the number of Colony Forming Units introduced and the corresponding capture rate, evaluated by spreading on agar media in a Petri dish.

TABLE 3

Results of the capture of microorganisms

| Column | Introduced CFU | Percentage of capture | Mean |
|---|---|---|---|
| 1 | $9.64 \times 10^6$ | 95.71% | 93.27% |
| 2 | $9.64 \times 10^6$ | 91.56% | |
| 3 | $9.64 \times 10^6$ | 92.55% | |
| 4 | $9.64 \times 10^4$ | 93.54% | 93.52% |
| 5 | $9.64 \times 10^4$ | 92.97% | |
| 6 | $9.64 \times 10^4$ | 94.06% | |

Table 4 presents the number of Colony Forming Units introduced and the corresponding uptake rate, evaluated by cytometry.

TABLE 4

Results of the capture of microorganisms

| Column | Introduced CFU | Percentage of capture | Mean |
|---|---|---|---|
| 1 | $1.25 \times 10^7$ | 96.98% | 94.37% |
| 2 | $1.25 \times 10^7$ | 92.58% | |
| 3 | $1.25 \times 10^7$ | 93.54% | |
| 4 | $1.25 \times 10^5$ | 94.04% | 94.02% |
| 5 | $1.25 \times 10^5$ | 93.81% | |
| 6 | $1.25 \times 10^5$ | 94.20% | |

Example 10

Glass Beads Functionalization Protocol 300 mg of glass beads with a diameter of 30-50 μm were distributed in 0.8 mL columns fitted with a 20 μm frit. 142.8 μL of an aqueous solution of polyethyleneimine (branched, 1.3 kDa) at 0.5% (m/v) was added to each of the columns. A contact time of 5 min was observed between the beads and the polyethyleneimine. The solution was then removed using a vacuum chamber system and a pump set to 50 mbar vacuum. The column was rinsed using 1 mL of molecular biology water with the same depression. The pump was then set to 700 mbar of depression for drying for 5 min. After this step, the glass beads functionalized with polyethyleneimine were ready to use.

Protocol for Capture/Elimination of Micro-Organisms

Initially, a count of the stock suspension of *Escherichia coli* CIP 54.8 was carried out by successive tenth dilutions in physiological water 0.85% NaCl and spreading on media agar in a Petri dish. 500 μL of suspension at the desired concentration were added per column and the capture method was carried out in flow using the vacuum chamber system.

The vacuum was set to 50 mbar. The 500 μL of suspension that passed through the column was collected in a tube and then counted by successive tenth dilutions in 0.85% NaCl physiological water and spread on agar media in a Petri dish.

Microorganism Elution Protocol 2 successive elutions with 1 M NaCl of 500 μL each were carried out per column. The two elutions were carried out respecting a contact time of 5 min at room temperature. Aspiration was performed at 50 mbar depression. The two eluates were collected in different tubes using the vacuum chamber system. The 500 μL of eluate having passed through the column were collected in a tube and then counted by successive tenth dilutions in 0.85% NaCl physiological water and spread on agar media in a Petri dish.

Efficiency of Capture/Elimination of Micro-Organisms

Table 5 shows the number of Colony Forming Units introduced and the corresponding capture rate, evaluated by spreading on agar media in a Petri dish.

TABLE 5

| Results of the capture of microorganisms | | | |
|---|---|---|---|
| Column | Introduced CFU | Percentage of capture | Mean |
| 1 | 9.50 × $10^6$ | 87.80% | 88.16% |
| 2 | 9.50 × $10^6$ | 89.04% | |
| 3 | 9.50 × $10^6$ | 87.66% | |

Elution Efficiency

Table 6 presents the elution rate corresponding to each column.

TABLE 6

| Results of the elution of microorganisms | | |
|---|---|---|
| Column | Pourcentage cumulé d'élution | Mean |
| 1 | 83.27% | 88.46% |
| 2 | 88.34% | |
| 3 | 93.78% | |

The overall efficiency is therefore 77.98%.

Example 11: Protocol for Functionalizing Glass Beads 300 mg of glass beads with a diameter of 30-50 μm were distributed in 0.8 mL columns equipped with a 20 μm frit. 142.8 μL of a aqueous solution of polyethyleneimine (branched, 1.3 kDa) at 0.5% (m/v) was added to each of the columns. A contact time of 5 min was observed between the beads and the polyethyleneimine. The solution was then removed using a vacuum chamber system and a pump set to 50 mbar vacuum. The column was rinsed using 1 mL of molecular biology water with the same depression. The pump was then set to 700 mbar of depression for drying for 5 min.

After this step, the glass beads functionalized with polyethyleneimine were ready to use.

Protocol for Capture/Elimination of Micro-Organisms

Initially, a count of the stock suspension of *Escherichia coli* CIP 54.8 was carried out by successive tenth dilutions in physiological water 0.85% NaCl and spreading on media agar in a Petri dish. 500 μL of suspension at the desired concentration were added per column and aspiration was performed after a contact time of 5 min between the solution and the beads contained in the column. Aspiration was performed using the vacuum chamber system. The vacuum was set to 50 mbar. The 500 μL of suspension that passed through the column was collected in a tube and then counted by successive tenth dilutions in 0.85% NaCl physiological water and spread on agar media in a Petri dish.

Microorganism Elution Protocol

An elution with 1 M NaCl of 500 μL was carried out per column.

The elution was carried out respecting a contact time of 5 min at room temperature. Aspiration was performed at 50 mbar depression. The 500 μL of eluate having passed through the column were collected in a tube and then counted by successive tenth dilutions in 0.85% NaCl physiological water and spread on agar media in a Petri dish.

Efficiency of Capture/Elimination of Micro-Organisms

Table 7 shows the number of Colony Forming Units introduced and the corresponding capture rate, evaluated by spreading on agar media in a Petri dish.

TABLE 7

| Results of the capture of microorganisms | | | |
|---|---|---|---|
| Column | Introduced CFU | Percentage of capture | Mean |
| 1 | 1.27 × $10^7$ | 96.85% | 96.69% |
| 2 | 1.27 × $10^7$ | 96.95% | |
| 3 | 1.27 × $10^7$ | 96.27% | |

Elution Efficiency

Table 8 presents the elution rate corresponding to each column.

TABLE 8

| Results of the elution of microorganisms | | |
|---|---|---|
| Column | Pourcentage cumulé d'élution | Mean |
| 1 | 73.94% | 81.53% |
| 2 | 86.51% | |
| 3 | 84.14% | |

The overall efficiency is therefore 78.83%.

Example 12: —Protocol for Functionalizing the Glass Beads 956 mg of glass beads with a diameter of 105-150 μm were distributed in 0.8 mL columns fitted with a 20 μm frit. 455.1 μL of an aqueous solution of polyethyleneimine (branched, 1.3 kDa) at 0.16% (m/v) were added to each of the columns. A contact time of 5 min was observed between the beads and the polyethyleneimine. The solution was then removed using a vacuum chamber system and a pump set to 50 mbar vacuum. The column was rinsed using 1 mL of molecular biology water with the same depression.

Protocol for Capture/Elimination of Micro-Organisms

Initially, a cytometer count of the stock suspension of *Escherichia coli* CIP 54.8 was carried out by successive tenth dilutions in 0.85% NaCl physiological water or 50 mM Tris pH 7.5. 500 μL of suspension at the desired concentration were added per column and the capture method was carried out in flow using the vacuum chamber system.

The vacuum was set to 50 mbar. The 500 μL of suspension having passed through the column were collected in a tube and then a cytometer count was carried out by successive tenth dilutions in 0.85% NaCl physiological water or 50 mM Tris pH 7.5.

Microorganism Elution Protocol

Three successive elutions using 500 μL of elution solution (50 mM Tris pH 9.5, 1 M NaCl) were performed per column. The elutions were carried out by systematically respecting a contact time of 5 min at room temperature. Aspiration was performed at 50 mbar depression. The 500 μL of eluate that passed through the column was collected in a tube and then counted using a cytometer by successive tenth dilutions in 0.85% NaCl physiological water or 50 mM Tris pH 7.5

Efficacy of the Uptake/Elimination of the Microorganisms

Table 9 presents the number of Colony Forming Units introduced and the corresponding uptake rate, evaluated by cytometry.

TABLE 9

| Results of the capture of microorganisms | | | |
|---|---|---|---|
| Column | Introduced CFU | Percentage of capture | Mean |
| 1 | $1.72 \times 10^7$ | 82.15% | 82.83% |
| 2 | $1.72 \times 10^7$ | 82.50% | |
| 3 | $1.72 \times 10^7$ | 83.85% | |

Elution Efficiency

Table 10 shows the column and the corresponding elution rate assessed by flow cytometry.

TABLE 10

| Results of the elution of microorganisms | | |
|---|---|---|
| Column | Pourcentage cumulé d'élution | Mean |
| 1 | 91.84% | 90.84% |
| 2 | 96.58% | |
| 3 | 84.11% | |

The overall yield is therefore 75.24%.

Example 13: Protocol for Functionalizing Glass Beads 300 mg of glass beads with a diameter of 30-50 μm were distributed in 0.8 mL columns equipped with a 20 μm frit. 142.8 μL of an aqueous solution of polyethyleneimine (branched, 1.3 kDa) at 0.5% (m/v) was added to each of the columns.

A contact time of 5 min was observed between the beads and the polyethyleneimine. The solution was then removed using a vacuum chamber system and a pump set to 50 mbar vacuum. The column was rinsed using 1 mL of molecular biology water with the same depression. The pump was then set to 700 mbar of depression for drying for 5 min. After this step, the glass beads functionalized with polyethyleneimine were ready to use.

Protocol for Capture/Elimination of Microorganisms

Initially, a cytometer count of the stock suspensions of *Staphylococcus aureus, Pseudomonas aeruginosa* ATCC 13388 and *Salmonella enterica* subsp. *enterica* serovar *Enteritidis* ATCC 13076 was prepared by successive tenth dilutions in physiological water 0.85% NaCl of Tris 50 mM pH 7.5. 500 μL of suspension at the desired concentration were added per column and the capture method was carried out in flow using the vacuum chamber system.

The vacuum was set to 50 mbar. The 500 μL of suspension having passed through the column were collected in a tube and then a cytometer count was carried out by successive tenth dilutions in 0.85% NaCl physiological water or 50 mM Tris pH 7.5.

Efficiency of Capture/Elimination of Micro-Organisms

Table 11 presents the number of Colony Forming Units introduced and the corresponding rate of capture, evaluated by cytometry.

TABLE 11

| Results of the capture of microorganisms | | | | |
|---|---|---|---|---|
| Strains | Column | Introduced CFU | Percentage of capture | Mean |
| *Staphylococcus aureus* | 1 | $5.19 \times 10^6$ | 98.19% | 98.48% |
| | 2 | $5.19 \times 10^6$ | 99.18% | |
| | 3 | $5.19 \times 10^6$ | 98.06% | |
| *Pseudomonas aeruginosa* | 4 | $1.46 \times 10^7$ | 94.15% | 89.08% |
| ATCC 13388 | 5 | $1.46 \times 10^7$ | 90.02% | |
| | 6 | $1.46 \times 10^7$ | 83.08% | |
| *Salmonella enterica* | 7 | $1.07 \times 10^7$ | 94.66% | 94.16% |
| subsp. *enterica* serovar | 8 | $1.07 \times 10^7$ | 94.74% | |
| Enteritidis ATCC 13076 | 9 | $1.07 \times 10^7$ | 93.09% | |

Example 14

Protocol for the Functionalization of Glass Beads 300 mg of glass beads with a diameter of 30-50 μm were distributed in 0.8 mL columns equipped with a 20 μm frit. 142.8 μL of an aqueous solution of polyethyleneimine (branched, 1.3 kDa) at 0.5% (m/v) was added to each of the columns.

A contact time of 5 min was observed between the beads and the polyethyleneimine. The solution was then removed using a vacuum chamber system and a pump set to 50 mbar vacuum. The column was rinsed using 1 mL of molecular biology water with the same depression. The pump was then set to 700 mbar of depression for drying for 5 min. After this step, the glass beads functionalized with polyethyleneimine were ready to use.

Protocol for Capture/Elimination of Micro-Organisms

Initially, a cytometer count of the stock suspensions of *Escherichia coli* CIP 54.8 was carried out by successive tenth dilutions in physiological water 0.85% NaCl of Tris 50 mM pH 7.5. 500 μL of suspension at the desired concentration were added per column and the capture method was carried out in flow using the vacuum chamber system. The vacuum was set to 50 mbar.

The 500 μL of suspension having passed through the column were collected in a tube and then a cytometer count was carried out by successive tenth dilutions in 0.85% NaCl physiological water or 50 mM Tris pH 7.5.

Effectiveness of Capture/Elimination of Micro-Organisms

Table 12 presents the number of Colony Forming Units introduced and the corresponding uptake rate, evaluated by cytometry.

TABLE 12

Results of the capture of microorganisms

| Column | Introduced CFU | Percentage of capture | Mean |
|---|---|---|---|
| 1 | $1.33 \times 10^3$ | 99.40% | 99.69% |
| 2 | $1.33 \times 10^3$ | 100.00% | |
| 3 | $1.33 \times 10^3$ | 99.66% | |
| 4 | $1.33 \times 10^5$ | 99.97% | 99.55% |
| 5 | $1.33 \times 10^5$ | 99.49% | |
| 6 | $1.33 \times 10^5$ | 99.21% | |
| 7 | $1.33 \times 10^7$ | 98.84% | 98.20% |
| 8 | $1.33 \times 10^7$ | 98.15% | |
| 9 | $1.33 \times 10^7$ | 97.60% | |

Example 15

Protocol for the Functionalization of Glass Beads 1 g of glass beads with a diameter of 105-150 μm were distributed in 0.8 mL columns equipped with a 20 μm frit. 500 μL of a solution aqueous polyethyleneimine (branched 1.3 kDa) at 0.166% (m/v) were added to each of the columns.

A contact time of 10 min was observed between the beads and the polyethyleneimine. The solution was then removed using a vacuum chamber system and a pump set to 50 mbar vacuum. The column was rinsed using 1 mL of molecular biology water with the same depression. After this step, the glass beads functionalized with polyethyleneimine were ready to use.

Protocol for Capture/Elimination of Microorganisms

Initially, a cytometer count of the stock suspensions of the microorganisms used was carried out by successive tenth dilutions in physiological water 0.85% NaCl or Tris 50 mM pH 7.5.500 μL of suspension at the desired concentration were added per column and the capture method was carried out in flux using the vacuum chamber system. The vacuum was set to 50 mbar. The 500 μL of suspension having passed through the column were collected in a tube then a cytometer count was carried out by successive tenth dilutions in physiological water 0.85% NaCl of 50 mM Tris pH 7.5.

Microorganism Elution Protocol

Three successive elutions using 4 mL (8×500 μL) of 0.1% sodium hexametaphosphate were performed per column. The elutions were carried out by systematically respecting a contact time of 5 min at room temperature for the first 500 microliters of each elution. The remaining 3.5 mL was fluxed. Aspiration was performed at 50 mbar depression. The 4 mL of eluate that passed through the column was collected in a tube and then counted using a cytometer by successive tenth dilutions in 0.85% NaCl physiological water or 50 mM Tris pH 7.5.

Efficiency of the Capture/Elution Couple of Microorganisms

Table 13 presents the overall yield of the capture/elution of microorganisms.

TABLE 13

Results of the capture/elution of microorganisms

| Strains | Global yield |
|---|---|
| *Salmonella enterica* subsp. *enterica* serovar Choleraesuis CIP 55.133 | 93.29% |
| *Proteus mirabilis* CIP A235 | 94.55% |
| *Bacillus cereus* ATCC 10876 | 71.32% |
| *Bacillus thuringiensis* ATCC 10792 | 86.03% |
| *Enterobacter cloacae* NCTC 13406 | 75.88% |
| *Enterococcus faecium* ATCC 27270 | 81.32% |
| *Proteus mirabilis* ATCC 12453 | 82.19% |
| *Salmonella enterica* subsp. *enterica* serovar Enteritidis ATCC 13076 | 87.60% |

Example 16

Glass Beads Functionalization Protocol 1 g of glass beads with a diameter of 105-150 μm were distributed in 0.8 mL columns equipped with a 20 μm frit. 500 μL of an aqueous solution of polyethyleneimine (branched, 1.3 kDa) at 0.166% (m/v) was added to each of the columns.

A contact time of 10 min was observed between the beads and the polyethyleneimine. The solution was then removed using a vacuum chamber system and a pump set to 50 mbar vacuum. The column was rinsed using 1 mL of molecular biology water with the same depression. After this step, the glass beads functionalized with polyethyleneimine were ready to use. 25

Protocol for the Capture/Elimination of Micro-Organisms.

Initially, a cytometer enumeration of the stock suspensions of the microorganisms used was carried out by successive tenth dilutions in physiological water 0.85% NaCl of Tris 50 mM pH 7.5. 500 μL of suspension at the desired concentration were added per column and the capture method was carried out in flow using the vacuum chamber system. The vacuum was set to 50 mbar. The 500 μL of suspension having passed through the column were collected in a tube and then a cytometer count was carried out by successive tenth dilutions in 0.85% NaCl physiological water or 50 mM Tris pH 7.5.

Microorganism elution protocol Three successive elutions using 4 mL (8×500 μL) of 0.01% sodium hexametaphosphate were performed per column.

The elutions were carried out by systematically respecting a contact time of 5 min at room temperature for the first 500 microliters of each elution. The remaining 3.5 mL was fluxed. Aspiration was performed at 50 mbar depression. The 4 mL of eluate that passed through the column was collected in a tube and then counted using a cytometer by successive tenth dilutions in 0.85% NaCl physiological water or 50 mM Tris pH 7.5.

Efficiency of the Capture/Elution Couple of Microorganisms

TABLE 14

Results of the capture/elution of microorganisms

| Strains | Global yield |
|---|---|
| *Proteus mirabilis* CIP A235 | 91.76% |
| *Pseudomonas aeruginosa* ATCC 13388 | 78.86% |
| *Salmonella enterica* subsp. *enterica* serovar Enteritidis ATCC 13076 | 72.79% |
| *Meyerozyma guilliermondii* ATCC 6260 | 93.08% |
| *Hanseniaspora guilliermondii* ATCC 32857 | 78.63% |
| *Staphylococcus epidermidis* ATCC 49134 | 91.42% |
| *Staphylococcus aureus* | 95.18% |
| *Salmonella enterica* subsp. *enterica* serovar Choleraesuis CIP 55.133 | 85.89% |
| *Proteus mirabilis* CIP A235 | 90.76% |
| *Serratia marcescens* CIP 58.14 | 85.15% |
| *Escherichia coli* CIP 54.8 | 92.15% |
| *Bacillus pumilus* ATCC 14884 | 99.32% |
| *Enterobacter cloacae* NCTC 13406 | 93.95% |

Example 17

Protocol for Functionalizing Glass Beads 1 g of glass beads with a diameter of 105-150 μm were distributed in 0.8 mL columns equipped with a 20 μm frit. 500 μL of an aqueous solution of polyethyleneimine (branched, 1.3 kDa) at 0.166% (m/v) was added to each of the columns.

A contact time of 10 min was observed between the beads and the polyethyleneimine. The solution was then removed using a vacuum chamber system and a pump set to 50 mbar vacuum. The column was rinsed using 1 mL of molecular biology water with the same depression. After this step, the glass beads functionalized with polyethyleneimine were ready to use.

Protocol for Capture/Elimination of Micro-Organisms

Initially, a cytometer count of the stock suspensions of *Escherichia coli* CIP 54.8 was carried out by successive tenth dilutions in physiological water 0.85% NaCl or Tris 50 mM pH 7.5. 500 μL of a tea-based beverage (Nestea peach flavor) containing a desired concentration of microorganisms was added per column and the capture method was carried out in flow using the vacuum chamber system. The vacuum was set to 50 mbar.

The 500 μL of suspension having passed through the column were collected in a tube and then a cytometer count was carried out by successive tenth dilutions in 0.85% NaCl physiological water or 50 mM Tris pH 7.5.

Microorganism Elution Protocol

Three successive elutions using 4 mL (8×500 μL) of 0.01% sodium hexametaphosphate were performed per column. The elutions were carried out by systematically respecting a contact time of 5 min at room temperature for the first 500 microliters of each elution. The remaining 3.5 mL was fluxed. Aspiration was performed at 50 mbar depression. The 4 mL of eluate that passed through the column was collected in a tube and then counted using a cytometer by successive tenth dilutions in 0.85% NaCl physiological water or 50 mM Tris pH 7.5.

Efficiency of Uptake

Table 15 presents the number of Colony Forming Units introduced and the corresponding uptake rate, evaluated by cytometry

TABLE 15

Results of the capture of microorganisms

| Column | Introduced CFU | Percentage of capture | Mean |
|---|---|---|---|
| 1 | $1.57 \times 10^7$ | 93.45% | 96.4% |
| 2 | $1.57 \times 10^7$ | 95.77% | |
| 3 | $1.57 \times 10^7$ | 100% | |

Elution Efficiency

Table 16 shows the column and the corresponding elution rate assessed by flow cytometry.

TABLE 16

Results of the elution of microorganisms

| Column | Pourcentage d'élution | Mean |
|---|---|---|
| 1 | 89.06% | 90.84% |
| 2 | 88.14% | |
| 3 | 92.42% | |

The overall yield is therefore 88.2%

Example 18

Glass Beads Functionalization Protocol 1 g of glass beads with a diameter of 105-150 μm were distributed in 2.4 mL columns equipped with a frit of 45-90 μm. 500 μL of an aqueous solution of polyethyleneimine (branched, 1.3 kDa) at 0.166% (m/v) was added to each of the columns. A contact time of 10 min was observed between the beads and the polyethyleneimine. The solution was then removed using a vacuum chamber system and a pump set to 50 mbar vacuum. The column was rinsed using 1 mL of molecular biology water with the same depression.

After this step, the glass beads functionalized with polyethyleneimine were ready to use.

Protocol for Capture/Elimination of Micro-Organisms

Initially, a cytometer count of the mother suspension of *Serratia marcescens* CIP 58.14 was carried out by successive tenth dilutions in physiological water 0.85% NaCl via cytometry. 8 mL of suspension at the desired concentration were added per column and the capture method was carried out in flux using the vacuum chamber system.

The vacuum was set to 50 mbar. The 8 mL of suspension that passed through the column was collected in a tube and then a cytometer count was performed by successive tenth dilutions in 0.85% NaCl physiological water. —Microorganism elution protocol Three successive elutions using 4 mL (8×500 μL) of 0.01% sodium hexametaphosphate were performed per column. The elutions were carried out by systematically respecting a contact time of 5 min at room temperature for the first 500 microliters of each elution. The remaining 3.5 mL was fluxed. Aspiration was performed at 50 mbar depression. The 4 mL of eluate that passed through the column was collected in a tube and then counted using a cytometer by successive tenth dilutions in 0.85% NaCl physiological water.

Uptake Efficiency

Table 17 shows the number of Colony Forming Units introduced and the corresponding uptake rate, evaluated by cytometry

TABLE 17

| Results of the capture of microorganisms | | | |
|---|---|---|---|
| Column | Introduced CFU | Percentage of capture | Mean |
| 1 | $1.03 \times 10^7$ | 85.81% | 83.57% |
| 2 | $1.0.3 \times 10^7$ | 81.20% | |
| 3 | $1.03 \times 10^7$ | 83.71% | |

Elution Efficiency

Table 18 shows the column and the corresponding elution rate evaluated by cytometry.

TABLE 18

| Results of the elution of microorganisms | | |
|---|---|---|
| Column | Pourcentage cumulé d'élution | Mean |
| 1 | 100% | 100% |
| 2 | 100% | |
| 3 | 100% | |

The overall yield is therefore 83.57%. Example 19: Application on yeasts—Protocol for functionalizing glass beads 1 g of glass beads with a diameter of 105-150 μm were distributed in 2.4 mL columns equipped with a 45-90 μm frit. 500 μL of an aqueous solution of polyethyleneimine (branched, 1.3 kDa) at 0.166% (m/v) was added to each of the columns. A contact time of 10 min was observed between the beads and the polyethyleneimine. The solution was then removed using a vacuum chamber and a pump set to 50 mbar of vacuum. The column was rinsed using 1 mL of molecular biology water with the same depression. After this step, the glass beads functionalized with polyethyleneimine were ready to use.

Protocol for the Capture/Elimination of Microorganisms

The stock suspensions of *Candida albicans* (ATCC 14053), *Candida parapsilosis* (ATCC 22019) and *Saccharomyces cerevisiae* (ATCC 18824) are diluted to 10th in physiological water 0.85% NaCl then counted by flow cytometry. 500 μL of suspension at the desired concentration were added per column and drawn in flow through the column using the vacuum chamber (50 mbar) and pump system. A count of the permeates was carried out by cytometry.

Microorganism Elution Protocol

Three successive elutions using 4 mL (8×500 μL) of 0.01% sodium hexametaphosphate were performed per column. The elutions were carried out by systematically respecting a contact time of 5 min at room temperature for the first 500 microliters of each elution. The remaining 3.5 mL was fluxed.

Aspiration was performed at 50 mbar depression. The 4 mL of eluate that passed through the column was collected in a tube and then counted using a cytometer by successive tenth dilutions in 0.85% NaCl physiological water.

Uptake Efficiency

Table 19 shows the number of Colony Forming Units introduced and the corresponding uptake rate for each strain, evaluated by cytometry.

TABLE 19

| Results of the capture | | |
|---|---|---|
| Column | Introduced CFU | Percentage of capture |
| *Candida albicans* (n = 3) | 3.23E+05 | 96.90% |
| *Candida parapsilosis* (n = 3) | 4.71E+05 | 98.10% |
| *Saccharomyces cerevisiae* (n = 3) | 3.92E+06 | 95.40% |

Elution Efficiency

Table 20 shows the column and the corresponding elution rate evaluated by flow cytometry.

TABLE 20

| Results of the elution | |
|---|---|
| Column | Pourcentage d'élution |
| *Candida albicans* (n = 3) | 72.8% |
| *Candida parapsilosis* (n = 3) | 69.8% |
| *Saccharomyces cerevisiae* (n = 3) | 81.5% |

Example 20

Application to Fungi—Protocol for Functionalizing Glass Beads 1 g of glass beads with a diameter of 105-150 μm were distributed in 2.4 mL columns fitted with a 45-90 μm frit.

500 μL of an aqueous solution of polyethyleneimine (branched, 1.3 kDa) at 0.166% (m/v) was added to each of the columns.

A contact time of 10 min was observed between the beads and the polyethyleneimine. The solution was then removed using a vacuum chamber system and a pump set to 50 mbar vacuum. The column was rinsed using 1 mL of molecular biology water with the same depression. After this step, the glass beads functionalized with polyethyleneimine were ready to use.

Protocol for Capture/Elimination of Microorganisms

The stock suspensions of *Fusarium oxysporum* (UBOCC-A-112042) and *Mucor racemosus* (ATCC 42647) are diluted to 10th in 0.85% NaCl physiological water and then counted by flow cytometry. 500 μL of suspension at the desired concentration were added per column and drawn in flow through the column using the vacuum chamber (50 mbar) and pump system. A count of the permeates was carried out by cytometry.

Microorganism Elution Protocol

Three successive elutions using 4 mL (8×500 μL) of 0.01% sodium hexametaphosphate were performed per column.

The elutions were carried out by systematically respecting a contact time of 5 min at room temperature for the first 500 microliters of each elution. The remaining 3.5 mL was fluxed. Aspiration was performed at 50 mbar depression. The 4 mL of eluate that passed through the column was collected in a tube and then counted using a cytometer by successive tenth dilutions in 0.85% NaCl physiological water.

Capture Efficiency

Table 21 shows the number of Colony Forming Units introduced and the corresponding uptake rate for each strain, evaluated by cytometry.

TABLE 21

| Results of the capture | | |
|---|---|---|
| Column | Introduced CFU | Percentage of capture |
| *Fusarium oxysporum* (n = 3) | 5.1E+05 | 76.70% |
| *Mucor racemosus* (n = 3) | 4.71E+05 | 80.20% |

Elution Efficiency

Table 22 shows the column and the corresponding elution rate evaluated by flow cytometry.

TABLE 22

| Results of the elution | |
|---|---|
| Column | Percentage of elution |
| *Fusarium oxysporum* (n = 3) | 55.2% |
| *Mucor racemosus* (n = 3) | 63.8% |

The invention claimed is:

1. A method for capturing living microorganisms comprising a step of bringing into contact, a liquid or viscous sample containing the microorganism, with a device comprising a hollow container containing non-magnetic glass beads consisting of a soda-lime glass or a borosilicate glass with polyethyleneimine adsorbed on the surface of the glass beads, wherein the molecular mass of the adsorbed polyethyleneimine is comprised of 0.6 to 2000 kDa, under conditions making it possible to create an interaction between the microorganism and the glass beads, and to obtain the microorganism captured on the glass beads, wherein a proportion of the microorganisms originating from the sample and captured on the glass beads is between 0.001% and 100% for a debacterization of said sample.

2. The method according to claim 1, comprising an additional step of eluting the previously captured microorganisms under conditions allowing the separation of the microorganisms captured from the glass beads and the recovery of the microorganism.

3. The method according to claim 1, wherein the microorganisms are selected from the group consisting of bacteria and fungi, and, wherein said fungi is selected from the group consisting of: *Absidia, Alternaria, Aspergillus, Aureobasidium, Botrytis, Brettanomyces, Byssochlamys, Candida, Chaetomium, Cladosporium, Colletotrichum, Cryptococcus, Debaryomyces, Emericella, Epicoccum, Eupenicillium, Eurotium, Fusarium, Galactomyces, Geotrichum, Gliocladium, Hanseniaspora, Humicola, Hyphopichia, Kluyveromyces, Lichtheimia, Lodderomyces, Meyerozyma, Monascus, Mucor, Mycocladus, Neosartorya, Nigrospora, Paecilomyces, Penicillium, Pestalotia, Phoma, Phytophthora, Pichia, Pythium, Rhizoctonia, Rhizopus, Rhodotorula, Saccharomyces, Saccharomycopsis, Schizosaccharomyces, Sclerotinia, Scopulariopsis, Serpula, Stemphylium Talaromyces, Thielaviopsis, Torulaspora, Trichoderma, Trichosporon*, Trichothetium, *Ulocladium, Verticillium, Wallemia, Wickerhamomyces, Xylaria*, and *Zygosaccharomyces.*

4. The method according to claim 3, wherein the microorganisms are bacteria, and said bacteria is selected from the group consisting of *Acetobacter, Achromobacter, Acidovorax, Acinetobacter, Actinomyces, Aerococcus, Aeromonas, Alcaligenes, Alicyclobacillus, Aquaspirillum, Asaia, Bacillus, Bifidobacterium* sp., *Bordetella, Brachybacterium, Brevibacillus, Brevibacterium, Brevundimonas, Burkholderia, Buttiauxella, Campylobacter, Carnobacterium*, Cellulomona, *Citrobacter, Clavibacter Clostridium, Corynebacterium*, Cronobacte, Cupriavidu, *Curtobacterium, Elizabethkingia*, Enteractinococcus, *Enterobacter, Enterococcus, Escherichia, Flacklamia, Flavobacterium, Geobacillus*, Glutamicibacte, Halobacillus, *Klebsiella, Kocuria, Lactobacillus, Lactococcus, Leclercia*, Lelliottia, *Leuconostoc, Lysinibacillus, Macrococcus*, Methylobacteriu, *Microbacterium* spp. (CDC A-5), *Micrococcus, Moraxell, Mycobacterium, Nesterenkonia, Oceanobacillus* sp, *Ochrobactrum, Paenibacillus, Pandorae, Pantoea, Paracoccus, Pasteurell, Pediococcus, Propionibacterium, Proteus, Pseudomonas, Ralstonia, Rhizobium, Roseomona, Rothia, Salmonella, Sanguibacter, Serratia, Shewanella, Sphingomonas, Sporolactobacillus, Sporosarcina, Staphylococcus, Stenotrophomonas, Streptococcus, Streptomyces, Thermoanaerobacterium, Variovorax*, and *Virgibacillus.*

5. The method according to claim 1, wherein the liquid or viscous sample is chosen from the group consisting of:

a biological, human or veterinary sample, a pharmaceutical sample, a cosmetic sample, a food sample, a sample of process water, and an environmental type sample.

6. The method, according to claim 5, wherein the liquid or viscous sample is a biological, human or veterinary sample is selected from the group consisting of: urine, blood, synovial fluid, lymph, liquid lachrymal, secretions and mucous membranes.

7. The method, according to claim 5, wherein the liquid or viscous sample is a pharmaceutical sample selected from the group consisting of: solutions for injection, syrups, vaccines, eye drops and ophthalmic gels.

8. The method, according to claim 5, wherein the liquid or viscous sample is a cosmetic sample selected from the group consisting of: make-up removers, products for cleaning the skin, deodorants, products intended for shaving, self-tanners, sun protection creams, solvents, shampoos and conditioners.

9. The method, according to claim 5, wherein the liquid or viscous sample is a sample of process water that is a sample from the loops of cleaning.

10. The method, according to claim 5, wherein the liquid or viscous sample is an environmental type sample selected from the group consisting of: marine and rain samples.

11. The method, according to claim 5, wherein the liquid or viscous sample is a food sample selected from the group consisting of: drinks, meats, ready meals, dairy products and egg products.

12. The method, according to claim 11, wherein the liquid or viscous sample is a drink selected from the group consisting of: water, milk, fruit juices, sodas, alcoholic beverages and tea-based beverages.

13. The method, according to claim 12, wherein the liquid or viscous sample is orange juice.

* * * * *